US012254392B2

(12) United States Patent
Hasibi et al.

(10) Patent No.: US 12,254,392 B2
(45) Date of Patent: Mar. 18, 2025

(54) APPARATUS AND METHOD FOR PROPERTY JOINT INTERPOLATION AND PREDICTION

(71) Applicant: ASML NETHERLANDS B.V., Veldhoven (NL)

(72) Inventors: Faegheh Hasibi, Eindhoven (NL); Leon Paul Van Dijk, Eindhoven (NL); Maialen Larranaga, Eindhoven (NL); Alexander Ypma, Eindhoven (NL); Richard Johannes Franciscus Van Haren, Waalre (NL)

(73) Assignee: ASML NETHERLANDS B.V., Veldhoven (NL)

( * ) Notice: Subject to any disclaimer, the term of this patent is extended or adjusted under 35 U.S.C. 154(b) by 871 days.

(21) Appl. No.: 17/423,658

(22) PCT Filed: Dec. 12, 2019

(86) PCT No.: PCT/EP2019/084923
§ 371 (c)(1),
(2) Date: Jul. 16, 2021

(87) PCT Pub. No.: WO2020/156724
PCT Pub. Date: Aug. 6, 2020

(65) Prior Publication Data
US 2022/0083834 A1    Mar. 17, 2022

(30) Foreign Application Priority Data

Jan. 30, 2019   (EP) ..................................... 19154587
Mar. 20, 2019   (EP) ..................................... 19164072

(51) Int. Cl.
*G06F 30/398*   (2020.01)
*G03F 7/00*   (2006.01)
(Continued)

(52) U.S. Cl.
CPC ............... *G06N 3/04* (2013.01); *G03F 7/705* (2013.01); *G03F 7/70616* (2013.01);
(Continued)

(58) Field of Classification Search
USPC ......................................................... 716/51
See application file for complete search history.

(56) References Cited

U.S. PATENT DOCUMENTS

| 6,952,253 | B2 | 10/2005 | Lof et al. | |
|---|---|---|---|---|
| 2018/0024968 | A1* | 1/2018 | Clinchant | G06N 3/045 706/12 |
| 2018/0121592 | A1* | 5/2018 | Watanabe | G03F 7/7065 |

FOREIGN PATENT DOCUMENTS

| TW | 201901286 | 1/2019 |
|---|---|---|
| WO | 2016096309 | 6/2016 |

(Continued)

OTHER PUBLICATIONS

International Search Report and Written Opinion issued in corresponding PCT Patent Application No. PCT/EP2019/084923, dated Mar. 17, 2020.

(Continued)

*Primary Examiner* — Bryce M Aisaka
(74) *Attorney, Agent, or Firm* — Pillsbury Winthrop Shaw Pittman, LLP

(57) ABSTRACT

A method for predicting a property associated with a product unit. The method may include: obtaining a plurality of data sets, wherein each of the plurality of data sets includes data associated with a spatial distribution of a parameter across the product unit; representing each of the plurality of data sets as a multidimensional object; obtaining a convolutional neural network model trained with previously obtained multidimensional objects and properties of previous product units; and applying the convolutional neural network model
(Continued)

to the plurality of multidimensional objects representing the plurality of data sets, to predict the property associated with the product unit.

20 Claims, 4 Drawing Sheets

(51) Int. Cl.
  G06F 30/27 (2020.01)
  G06N 3/04 (2023.01)
  *G06F 119/18* (2020.01)
  *G06N 3/0464* (2023.01)
(52) U.S. Cl.
  CPC ............ G06F 30/27 (2020.01); G06F 30/398 (2020.01); *G06F 2119/18* (2020.01); *G06N 3/0464* (2023.01)

(56) References Cited

FOREIGN PATENT DOCUMENTS

| | | |
|---|---|---|
| WO | 2018072980 | 4/2018 |
| WO | 2018125220 | 7/2018 |
| WO | 2018153711 | 8/2018 |
| WO | 2018/177659 | 10/2018 |

OTHER PUBLICATIONS

Taiwanese Office Action issued in corresponding Taiwanese Patent Application No. 109100143, dated Dec. 16, 2020.
Office Action issued in corresponding Chinese Patent Application No. 201980090994, dated Jul. 30, 2024.
Office Action issued in Korean Patent Application No. 10-2021-7022854, dated Jul. 23, 2024.

\* cited by examiner

APPARATUS AND METHOD FOR PROPERTY JOINT INTERPOLATION AND PREDICTION

CROSS-REFERENCE TO RELATED APPLICATIONS

This application is the U.S. national phase entry of PCT Patent Application No. PCT/EP2019/084923 which was filed Dec. 12, 2019, which claims the benefit of priority of European Patent Application No. 19154587.0 which was filed on Jan. 30, 2019, and of European Patent Application No. 19164072.1 which was filed on Mar. 20, 2019, each of which is incorporated herein in its entirety by reference.

FIELD

The present invention relates to a method and apparatus for predicting a property associated with a product unit. Specifically, the invention relates to predicting a property based on a plurality of multidimensional data sets using a convolutional neural network.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as a "design layout" or "design") at a patterning device (e.g. a mask) onto a layer of radiation-sensitive material (resist) provided on a substrate (e.g. a wafer).

Lows $k_1$-lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and k1 is an empirical resolution factor. In general, the smaller k1 the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customised illumination schemes, use of phase shifting patterning devices, various optimisation of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

In order to improve the performance of a lithographic apparatus, metrology data from patterns projected by the lithography apparatus onto a substrate may be used. The metrology data may for example be used to adjust one or more patterning parameters of the lithographic apparatus, in order to improve reproduction of the actual pattern from the pattern design. Metrology data may for example be used to predict a property of a pattern on a substrate.

Different lithographic metrologies may have different spatial layouts. For example, different metrologies may have been measured at different locations across the substrate, or may have been measured with a different resolution on the substrate. It is possible to base a prediction of a property of the pattern on a plurality of metrologies. The current approach to combining these different metrologies has involved converting them to a target spatial layout, so that the different metrologies can be combined in the same spatial layout. However, using converted data for a property prediction may have a detrimental effect on the quality of the prediction. The current invention is concerned with improving the quality of the prediction and avoiding the step of converting metrology data to a target layout.

SUMMARY

The present invention provides a method for predicting a property associated with a product unit; a lithographic apparatus for carrying out the method; a recipe for controlling a lithographic apparatus according to the method; a computer program comprising instructions for carrying out the method and a carrier containing the computer program according to the appending claims.

According to an aspect of the disclosure there is provided a method for predicting a property associated with a product unit. The method may comprise obtaining a plurality of data sets, wherein each of the plurality of data sets comprises data associated with a spatial distribution of a parameter across the product unit, representing each of the plurality of data sets as a multidimensional object, obtaining a convolutional neural network model trained with previously obtained multidimensional objects and properties of previous product units, and applying the convolutional neural network model to the plurality of multidimensional objects representing the plurality of data sets, to predict the property associated with the product unit.

Optionally, the convolutional neural network model may comprise a plurality of sections, the plurality of sections comprising an input section, a merging section and an output section.

Optionally, the input section may comprise a plurality of divisions, each division configured to receive one of the plurality of the multidimensional objects. The method may further comprise inputting each of the multidimensional objects separately to a respective one division, wherein each division determines an input section output for the respective multidimensional object.

Optionally, each section may comprise at least one convolution operation.

Optionally, the method may comprise inputting the plurality of input section outputs to the merging section to determine a merging section output.

Optionally, a first and a second of the plurality of multidimensional objects have different layouts with respect to each other, and the input section transforms the different layouts such that the input section outputs which correspond to the first of the plurality of multidimensional objects and second of the plurality of multidimensional objects have a common layout.

Optionally, the method may further comprise: applying, in the input section, one or more first filters to the first of the plurality of multidimensional objects and applying, in the input section, one or more second filters to the second of the plurality of multidimensional objects; wherein the application of the one or more first filters and the application of the one or more second filters is set to determine the common layout of the input section outputs corresponding to the first and second of the plurality of multidimensional objects.

Optionally, the different layouts may comprise different sizes.

Optionally, the input section outputs may comprise a plurality of latent representations having the same size.

Optionally, a first and a second of the plurality of multidimensional objects may have different layouts with respect to each other. The input section outputs corresponding to the first and second multidimensional objects may have a common layout.

Optionally, the method may further comprise applying, in the input section, one or more first filters to the first of the plurality of multidimensional objects, and applying one or more second filters to the second of the plurality of multidimensional objects. The sizes of the one or more first filters and the sizes of the one or more second filters may be set to determine the common layout of the input section outputs corresponding to the first and second of the plurality of multidimensional objects.

Optionally, the method may further comprise inputting the merging section output to the output section to determine a model output of the convolutional neural network model.

Optionally, each section may comprise a plurality of layers.

Optionally, at least one of the plurality of layers may be a pooling layer.

Optionally, the method may further comprise obtaining training data associated with the product unit, training, based on the obtained training data, the convolutional neural network model to predict an data feature comprised within one or more features of the multidimensional objects. The data feature may correlate with a pre-defined structure comprised within the training data.

Optionally, the training data may comprise one or more properties of an apparatus used to pattern a product unit.

Optionally, the data in a data set may be metrology data associated with a spatial distribution of data points across the product unit.

Optionally, the plurality of data sets may comprise one or more of alignment data of the product unit, levelling data of the product unit, and overlay fingerprint data of an apparatus used to pattern the product unit.

Optionally, the property to be predicted may be a spatial distribution of a target parameter across the product unit.

Optionally, the target parameter may be overlay.

Optionally, the property may comprise a classification of the product unit.

Optionally, one of the plurality of data sets may have a different resolution to at least one other of the plurality of data sets.

Optionally, the data associated with a spatial distribution may comprise a plurality of data points corresponding to a plurality of positions on the product unit. The plurality of positions of a first of the plurality of data sets may be different from the plurality of positions of a second of the plurality of data sets.

Optionally, the method may further comprise obtaining context data corresponding to the plurality of data sets. The method may further comprise providing the context data to the convolutional neural network model.

Optionally, the method may further comprise training the convolutional neural network to predict an object structure comprised within features of the multidimensional objects, wherein the object structure correlates with a pre-defined structure comprised within the context data.

Optionally, applying the convolutional neural network model to the plurality of multidimensional objects may determine a model output, wherein the model output may comprise the property or a classification.

Optionally, applying the convolutional neural network model to the plurality of multidimensional objects may determine a model output, wherein the method may further comprise predicting the property by performing one or more processing steps on the model output.

Optionally, wherein the classification is a classification label identifying one or more of: a group of product units according to a property of the product units; a binary indicator representing where the data is within a predetermined classification.

Optionally, the method may further comprise providing the predicted property to a lithographic apparatus to determine one or more set points of the apparatus.

Optionally, the property associated with a product unit may be a property of a pattern formed using a lithographic apparatus on the product unit.

Optionally, the product unit may be a semiconductor substrate. Obtaining a plurality of data sets may comprise obtaining metrology data from a processed semiconductor substrate.

According to another aspect of the disclosure there is provided a lithographic apparatus comprising a processor configured to predict a property in accordance with a method described above and herein.

Optionally, the lithographic apparatus may further be configured to determine one or more set points of the lithographic apparatus based on the predicted property.

According to another aspect of the disclosure there is provided a recipe for controlling a lithographic apparatus comprising one or more set points of a control parameter associated with a property predicted according to a method described above.

Optionally, the control parameter may be associated with control of an overlay error of the lithographic apparatus.

According to another aspect of the disclosure there is provided a computer program comprising instructions which, when executed on at least one processor, cause the at least one processor to carry out the steps of a method described above.

According to another aspect of the disclosure there is provided a carrier containing the computer program described above, wherein the carrier may be one of an electronic signal, optical signal, radio signal, or non-transitory computer-readable storage medium.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
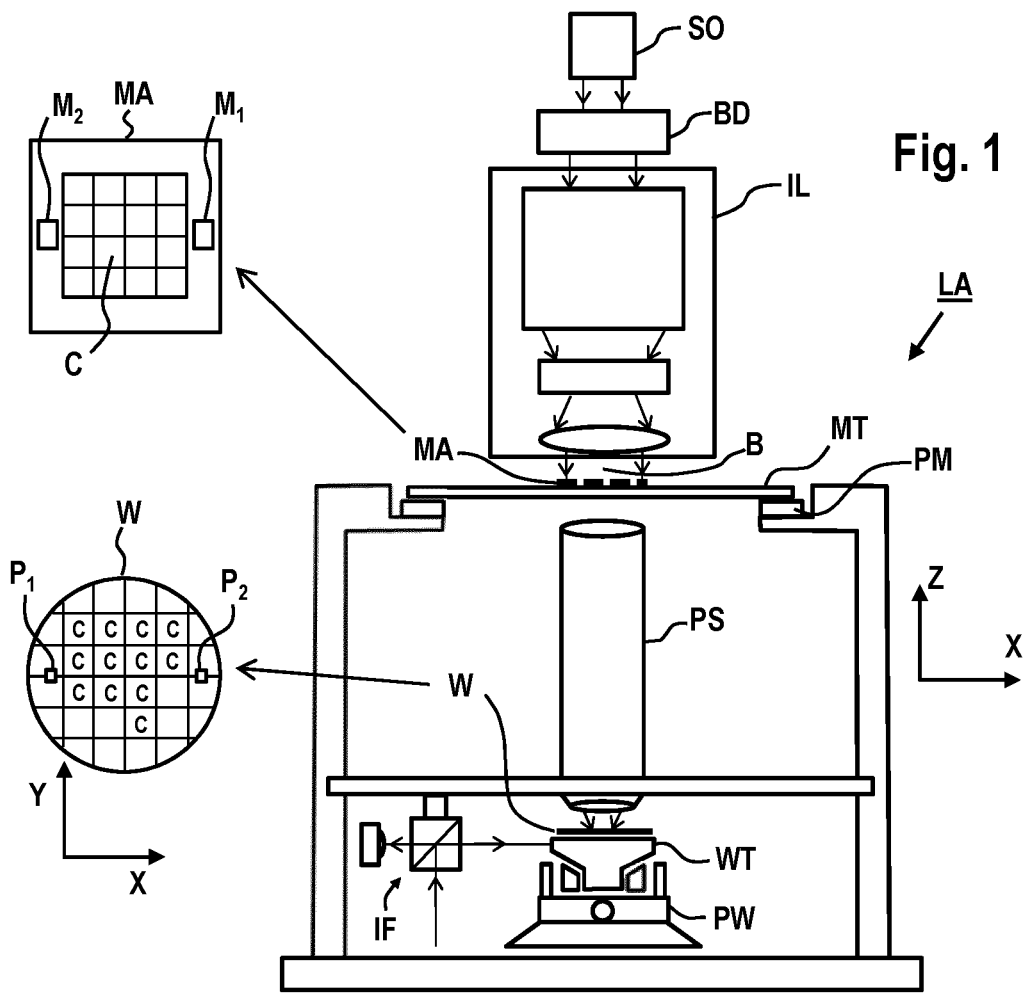
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
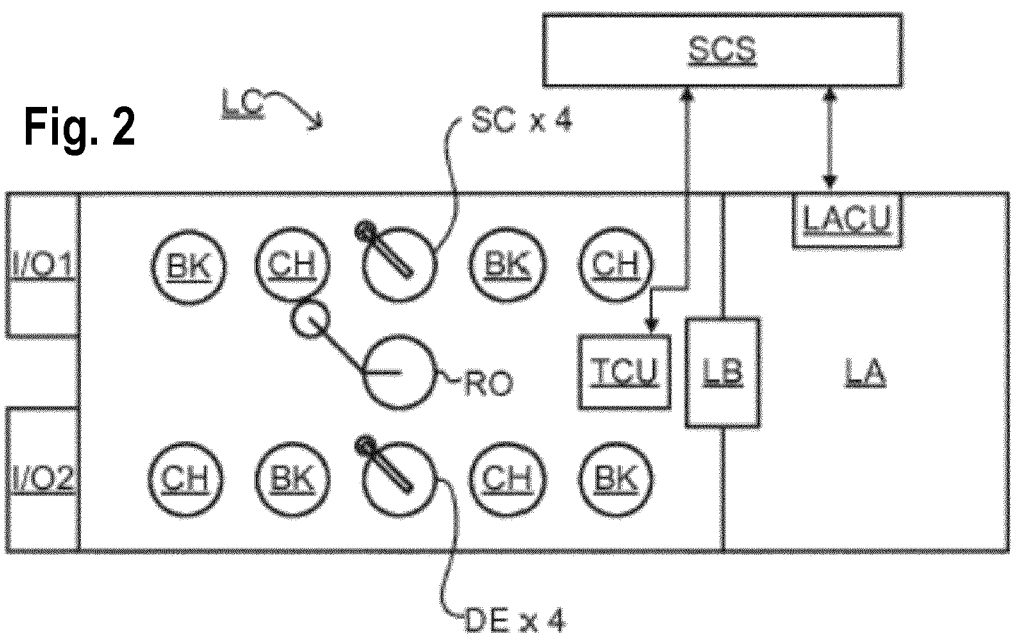
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
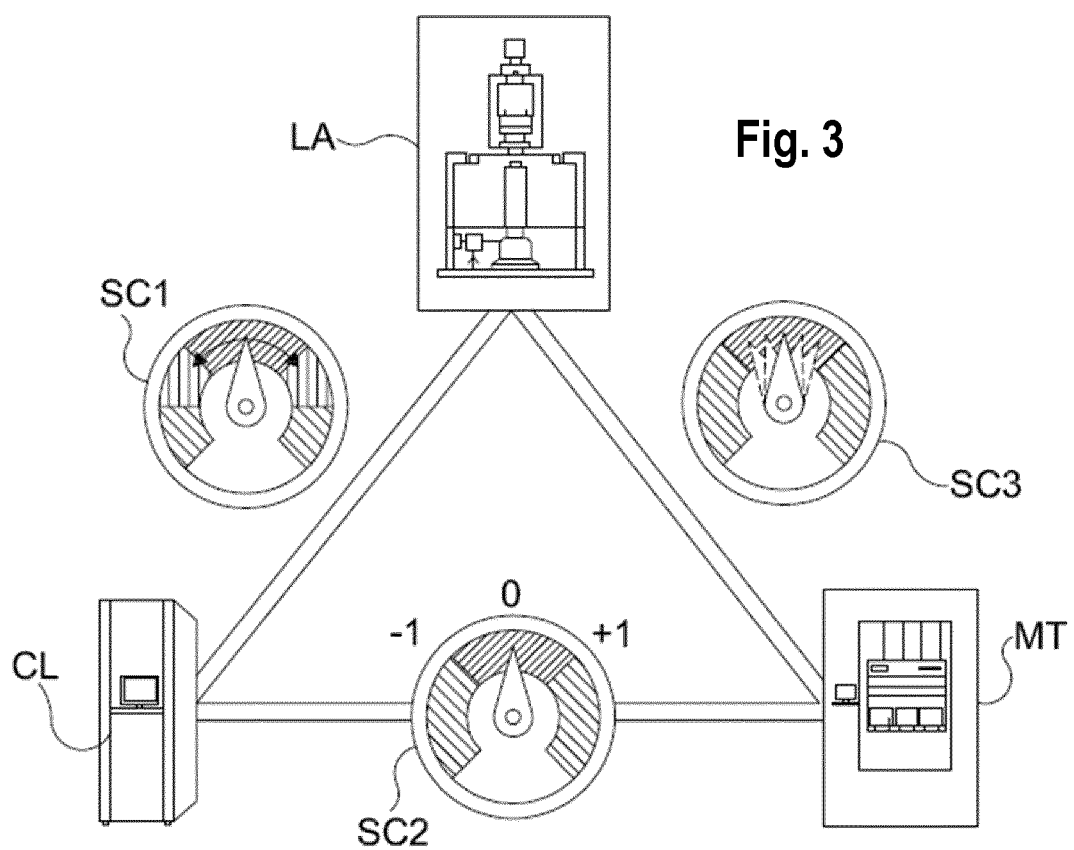
FIG. 3 depicts a schematic representation of holistic lithography, representing a cooperation between three key technologies to optimize semiconductor manufacturing.
Figure 4:
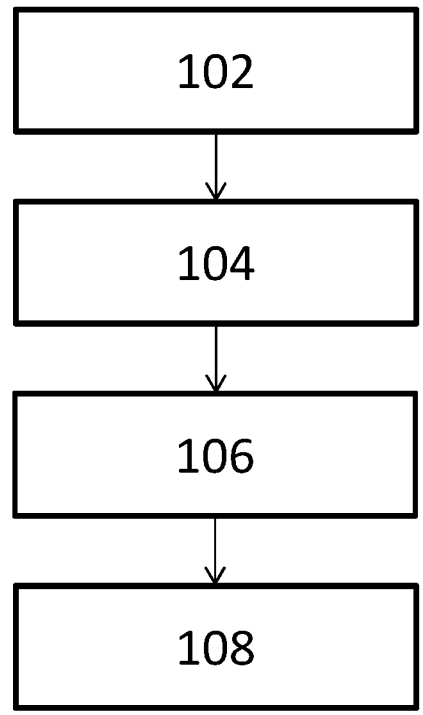
FIG. 4 depicts a flow diagram of a method according to an embodiment of the invention.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

Examples of properties, which may also be referred to as parameters, measured by a metrology tool MT are alignment AL, overlay OVL, and levelling LVL data relating to a pattern on a substrate W. Different metrology apparatus may be used to measure different parameters. Resulting metrology data may be different for different metrology parameters. For example, alignment AL measurements may be sparse compared to overlay OVL and levelling LVL measurements. Factors determining the density of measurements may for example include the time required to obtain a measurements, and the availability of measurement marks on a substrate W on which measurements can be performed for that parameter. In order to make a prediction of a property or control a property through machine calibration, metrology data of that property can be used. For example, in order to calibrate a lithographic apparatus LA for improved overlay OVL data in a pattern projected onto a substrate W, overlay OVL metrology data from previous patterns may be used. However, it may also be possible to gain information relating to a property, for example overlay OVL, from other measured parameters, for example alignment AL metrology and/or levelling LVL metrology.

In order to make a prediction of a property based on a plurality of different metrologies, the data of the different metrologies have to be combined. If the metrologies have different spatial layouts, that is to say, the measurements are made at different locations across a substrate W, one possible way to combine the data is to convert each of the metrologies to a target layout. The combination can be made based on the target layout, where the same spatial distribution of data is provided for each measured parameter. Converting a metrology layout to a target layout may involve interpolating data, for example a sparse metrology layout for alignment may be interpolated to a dense layout using known techniques. The interpolated target layout data may then be used for predicting a property.

There are a number of issues with using interpolated data for a prediction. The interpolated data is an estimation of actual metrology data, and may comprise uncertainty, which is not represented in the interpolated data. Not incorporating the uncertainty into the resulting prediction model for the property may negatively affect the prediction performance. The interpolated data may misrepresent or omit some of the actual measurement data of a parameter, which may reduce the quality of the resulting prediction. Furthermore, interpolated data may be erroneous, for example when interpolated very sparse data to a very dense layout, or when taking into account issues with measurement data, for example caused by deformed measurement marks, that do not accurately represent the parameter across the substrate W.

Described herein are methods and apparatus allowing the issues described above to be overcome by providing an alternative to separate interpolation and prediction steps and by effectively performing the interpolation and prediction jointly.

The method may be achieved using a convolutional neural network, which may be referred to as a convolutional neural network model (ConvNet). A ConvNet may be used to predict a property on a product unit. The product unit may be a substrate, e.g. a semiconductor wafer, comprising one or more patterns or features provided thereon. The one or more patterns or features may be provided by a method which includes at least one lithographic imaging technique employing a lithographic apparatus.

As described herein, metrology data of a lithographically patterned substrate may be provided to a ConvNet. Convolutional neural networks are a class of deep learning algorithms that may be used for image and pattern recognition. A convolutional neural network may be used for processing data with a grid-like topology, for example a wafer map representing a spatial distribution of parameter values across a wafer. ConvNet may comprise an input layer, an output layer, and may comprise one or more additional layers, which may be referred to as hidden layers. A ConvNet applies at least one convolution operation to the input, or a latent representation based on the input. An image may be provided as an input to a ConvNet, and the ConvNet may be configured, through training, to provide an output based on the input. The output may be a classification, that is to say, to place the input in one of a plurality of possible categories. For example, a ConvNet may classify an input as falling within or outside of performance boundaries. Alternatively or additionally, a ConvNet may provide a continuous output, that is to say, the output may be a continuous quantity, for example a prediction of a property of the pattern and/or substrate W, such as for example a parameter value.

In the methods described herein, metrology data of a lithographically patterned substrate may be provided as the input to a ConvNet which may process the data like an image, in order to find correlations between different metrology points on the substrate. Providing the metrology data for different measured properties can allow data (e.g. a substrate image) to be input without requiring interpolation, as the spatial distribution may express the relation between sparse and dense data.

The metrology of a parameter on a product unit may be represented as an image of the product unit and provided as an input to a ConvNet. A ConvNet may receive a plurality of images as input. An image provided as input may be a two dimensional image, representing a spatial distribution of a parameter across a product unit, wherein the spatial distribution may be the spatial distribution of the obtained metrology data. Metrology data relating to a measured parameter may be referred to as a metrology data set. A metrology data set may comprise multiple subsets of data across the spatial distribution of a product unit. For example, alignment data may have been obtained in a first subset, representing alignment in the X direction, and in a second subset, representing alignment in the Y-direction. Hence, the first and second directions may be perpendicular to each other. Alternatively, the first and second directions may be non-perpendicular, and non-parallel. Overlay data of a product unit may also be provided in first and second directions across a product unit in two subsets. Levelling data, which comprises a representation of a spatial distribution of the height of a product unit may comprise a single channel. The spatial distribution of the multiple subsets of a data set may be represented in a multidimensional object. The multidimensional object may be separable into a plurality of sub-images, wherein each sub-image represents a spatial distribution of a subset of a metrology data set. A subset, and a sub-image of a subset may be referred to as a channel.

Described herein is a method for predicting a property associated with a product unit, wherein the method comprises obtaining a plurality of data sets 102. Each of the plurality of data sets may comprise data associated with a spatial distribution of a parameter across a product unit. Each of the plurality of data sets may be represented as a multidimensional object. The method further comprises obtaining a convolutional neural network 104 (ConvNet), wherein the network has been trained using previously obtained multidimensional objects and properties of previous product units. The trained ConvNet is applied 106 to the plurality of multidimensional objects to predict 108 the property associated with the product unit, wherein each of the multidimensional objects represents a corresponding one of the plurality of data sets.

As described herein, metrology data may be used to refer to measurement data, for example one measurement, a group of related measurements, a collection of unrelated measurements, etc. The term metrology data set may be used to refer to metrology data relating to a measured parameter, for example an alignment data set. A data set may be used to refer to a group of data that can be represented as a multidimensional object. A data set may be a metrology data set, but is not necessarily limited to that, and may also comprise calculated or estimated data, and/or a combination of metrology and non-metrology data.

The one or more data sets mentioned above may be a metrology data set. The metrology data set may comprise metrology data associated with a spatial distribution of data points across the product unit. A data set may be based on metrology data, but may have been processed, for example to normalise the metrology data, to adjust the units of the metrology data, or to remove any data errors from the metrology data.

The plurality of data sets may comprise one or more of alignment AL data of the product unit, levelling LVL data of the product unit, and overlay OVL fingerprint data of an apparatus used to pattern the product unit. The overlay fingerprint data may be understood to be the overlay specific to an apparatus or apparatuses which is caused by the performance characteristics of the apparatus(es).

Figure 5:
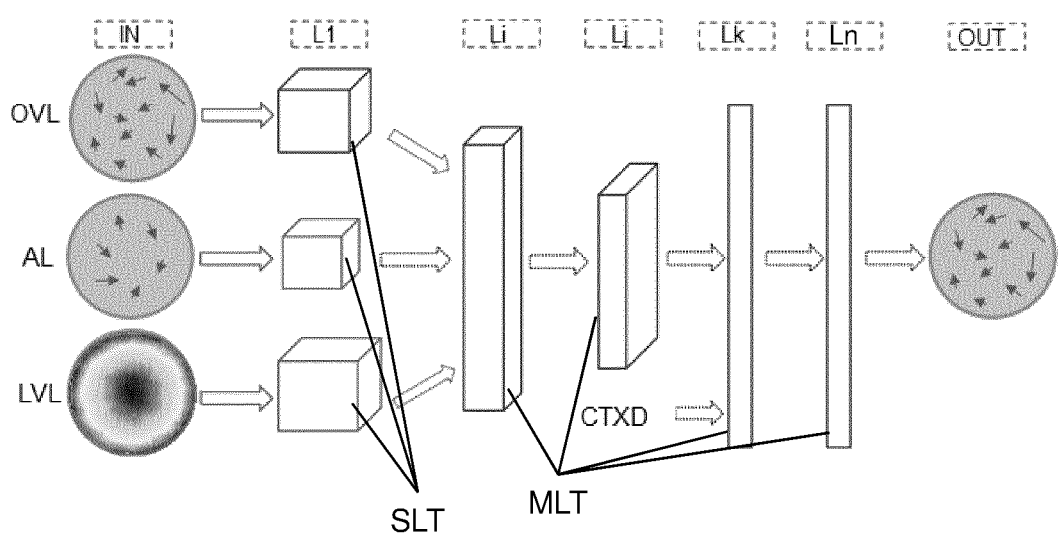
FIG. 5 depicts a schematic representation of the structure of a convolutional network model.

The data set and/or metrology data may have different resolution depending on the type of data set and speed at which the data can be acquired. The plurality of data sets may have the same or different resolutions. One data set of the plurality of data sets may have a different resolution to at least one other data set of the plurality of data sets. In some implementations all of the data sets may have different resolutions. A resolution may be understood to be the amount of data points provided across the product unit. In one example implementation, an alignment AL data set may have a first resolution that is lower than a second resolution of a levelling LVL data set, as is illustrated in FIG. 5. Data sets with different resolutions may be represented as multidimensional objects of the same size, wherein a data set with a lower resolution may comprise more null values, that is to say values for which there is no data value, than a data set with a higher resolution. Alternatively, a data set with a higher resolution may be represented as a larger multidimensional object compared to a multidimensional object representing a data set with a lower resolution.

The data set(s) provided to the ConvNet may have different resolutions. An advantage of providing a plurality of data sets with different resolutions to a ConvNet is that the different data sets do not require an interpolation step before they can be used for processing for predicting a property associated with a product unit. The ConvNet may receive the data set in the form of a multidimensional object, wherein representing the data set as a multidimensional object does not require interpolation. One or more of the data sets may have a different size to the other data sets, hence, a plurality of multidimensional objects of different sizes may be provided to the ConvNet. As noted above, this is advantageous as the interpolation step which may otherwise be needed may reduce loss of information within the data which would reduce the quality for predicting a property.

The data associated with a spatial distribution across the product unit may comprise a plurality of data points corresponding to a plurality of positions on the product unit. The positions of the data points of a first data set may differ from the positions of the data points of a second data set of the plurality of data sets. It is therefore possible for two data sets to have the same resolution, but a different set of positions. A spatial distribution of a data set may be used to comprise both the resolution and the positions of a data set. This information is captured in the representation of the data set as a multidimensional object.

The property to be predicted according to the method may be spatial distribution of a target parameter across the product unit. The target parameter may be overlay on the product unit or any other parameter which may be useful in determining a production related characteristic of the product unit. Alternatively, or additionally, the property comprises a classification of the product unit. Example classifications to be performed by a convolutional neural network include grouping product units according to a property, for example yield or overlay. The output of the ConvNet may be a classification label representing a group ID. Another example classification is for a ConvNet to provide a binary output (0/1, yes/no, true/false) as a response to a binary question. For example, a ConvNet may determine whether an overlay parameter (e.g. magnification) is within predetermined threshold and/or target values. A classification label output by a ConvNet may also assign a product unit into one or more groups, for example based on overlay properties of the product unit. As an example, a classification label may determine if a product unit 'does' or 'does not' have acceptable overlay errors. This is similar in some ways to a conventional ConvNet classification which may be used to recognise a classification of an image such as a dog or cat and assign a classification label such as 'cat' or 'no cat' for example.

FIG. 5 depicts a structure of a convolutional neural network suitable for predicting a property of a product unit. A property of a product unit may relate to a parameter of a product unit, and/or may comprise a classification label for the product unit. The image of FIG. 5 shows a ConvNet comprising a plurality of layers $L_1$ to $L_n$. An input IN is provided to the ConvNet, in the form of multidimensional objects each with a spatial distribution of data points corresponding to metrology data. The multidimensional objects may be referred to as images in the sense that they are processed by the ConvNet in a manner similar to an optical image, and also in as much as the multidimensional data may represent metrology data in the form of an optical image. The multidimensional object may comprise a single image, or it may comprise a plurality of sub-images. A sub-image may be referred to as a channel in relation to the ConvNet. In the case of the multidimensional object comprising a single image, this image may be referred to as a channel in relation to the ConvNet.

The ConvNet depicted in FIG. 5 comprises a plurality of layers, labelled $L_1$ to $L_n$, wherein n is a positive integer number. The ConvNet may comprise a first section, consisting of layers $L_1$ to $L_{i-1}$ referred to as a input section. The ConvNet may further comprise a second section, consisting of layers $L_i$ to $L_{j-1}$, referred to as a merging section. The ConvNet may also comprise a third section, consisting of layers $L_j$ to $L_n$, referred to as an output section. The output section comprises a layer $L_k$, at which context data CTXD may be added to the ConvNet. The output of the final layer $L_n$ of the ConvNet provides output OUT. In the ConvNet, each layer receives a layer input, and processes the layer input to produce a layer output. The layer output of the ConvNet other than the final layer $L_n$, may be referred to as a latent representation, as the output will not usually be provided or used externally to the ConvNet. The latent representation output by a layer is provided as an input to the next layer in the ConvNet. A latent representation may for example comprise one or more two-dimensional objects. The input section of the ConvNet provides a plurality of separate latent representations SLT as output for each layer. The merging section and output section provide a merged latent representation MLT as output.

As mentioned in relation to FIG. 5 above, the ConvNet may comprise a input section, a merging section, and an output section. The sections may be placed in series in the order listed above. An advantage of performing part of the analysis on separated multidimensional objects, and another part of merged data, is that the ConvNet can analyse the features of each multidimensional object in isolation, as well as effects that can be found based on a combination of and relationships between the data. The ConvNet is able to receive input data and make a prediction of a property without requiring interpolation of the input data.

The merging process of the ConvNet does not suffer from the problems of interpolation described above. However, the ConvNet may achieve an implicit interpolation by combining the data relating to the different data sets, as part of the merging section. A potential advantage of a ConvNet may therefore be that this implicit interpolation takes into account properties of a combination of multiple data sets as part of the implicit interpolation, instead of processing a data set independently of other data sets. This may improve the quality of the resulting prediction, as the ConvNet may be able to estimate properties based on a consideration of the data within the data sets as well as the relation between the data sets. When interpolation is performed as a separate calculation prior to the estimation process, the interpolation is based on one data set, without taking into account other data sets, which may results in the issues with interpolated data described in paragraph above. Using a ConvNet allows these issues to be overcome.

In the input section, the multidimensional objects may be processed separately. An advantage of this is that the data layout of one multidimensional object does not have to match or be considered in relation to a data layout of another multidimensional object. As part of the input sections, data layouts for the different multidimensional objects may be processed so that each multidimensional object has SLT with a common layout to be provided as input to the merging section. The processing of the different multidimensional objects to a common layout enables the combination of the different multidimensional objects in the merging section. Hence, the processing undertaken by the ConvNet during the input layers and prior to the merging section transforms the multidimensional objects to a common layout thereby removing the need to separately interpolate the metrology data. When the input section output provides latent representations of the same size as input to the merging section, the same filters may be applied to all of the latent representations and therefore the representations can be merged.

The input section may receive the ConvNet input IN as section input. The input section may produce an input section output. The input section output may comprise a plurality of separate latent representations. The input section may process the input IN to determine latent representations of the same size. The input section output may comprise a plurality of latent representations, wherein each of the latent representations has the same size. The input section output may be provided as input to the merging section. The merging section may produce a merging section output. The merging section output may comprise a merged latent representation. The merging section output may be provided as input to the output section, to produce an output. The output of the output section may be provided as the output OUT of the ConvNet. It is possible to perform one or more processing operations on an output OUT of the ConvNet before provided the output externally, for example to a user, or an apparatus.

In the input section of the ConvNet, each multidimensional object representing a data set may be processed separately. In order to achieve the separate processing of the multidimensional objects, the input section may comprise a plurality of divisions. The plurality of divisions may be parallel divisions. Each division may be configured to receive one of the multidimensional objects. Each division may be provided with a different data set, which may comprise metrology data which has been taken from a product unit which is being analysed.

Each of the plurality of multidimensional objects may be input separately to a respective one division of the input section. Each of the divisions may determine a separate latent representation for each layer of the input section. Each separate latent representation may be based on a different one of the multidimensional objects. Each division may determine one input section output based on the received respective one of the multidimensional objects. As an example, a ConvNet may comprise three parallel divisions: a first division may be provided with an input of alignment data, a second division may be provided with an input of overlay data, and a third division may be provided with an input of levelling data. The ConvNet may determine three latent representations in each layer of the input section, namely one for each division and corresponding input data set.

The merging section may receive the input section outputs provided by the divisions of the input section, and merge them so that they can be processed in combination. The merging section may combine all of the input section outputs, in order to produce a merging section output. The merging section output may be based on each of the multidimensional objects, thereby merging the plurality of data sets. The merging section output may be provided as an input to the output section of the ConvNet. The output section may determine an output of the ConvNet, which may also be referred to as a model output. For example, the output of the ConvNet may comprise a metrology map of an estimated feature of a product unit for which metrology data was provided as input.

One or more of the input section, the merging section, and the output section may comprise a plurality of layers. In some instances, each of the sections comprises a plurality of layers. If a section comprises a plurality of layers, one of the sections may be a pooling layer. A pooling layer will be described in more detail below.

The input section comprises a plurality of divisions, wherein the amount of divisions may be determined by the amount of multidimensional objects input into the ConvNet. The amount of divisions may be equal to the amount of multidimensional objects provided as input. The input section may comprise a plurality of layers. Each layer may comprise the same amount of divisions. There may be a corresponding division in each layer of the input section. Each division of a layer may determine a separate latent representation SLT. The separate representation of a division may be provided as an input to the corresponding division of the next layer of the input section. The plurality of separate latent representations SLT output by the final layer of the input section ($L_{i-1}$) may be the input section outputs.

Each division of the plurality of divisions of the input section of the ConvNet may comprise at least one convolution operation. The convolution operation may be performed in the same layer for each of the divisions. A layer in which a convolution operation is performed may be referred to as a convolutional layer. A convolutional layer in the input section may perform a convolution operation on each division, that is to say, a convolution operation is performed in the same one or more layers for each division. Convolutional layers will be described in more detail below.

The merging section may receive the input section outputs and process them together in a first layer of the merging section. The output of the first layer of the merging section may be a merged latent representation MLT. The merging section may comprise a plurality of layers, wherein each layer after the first layer of the merging section receives a merged latent representation MLT and outputs a merged latent representation MLT. The merged latent representation output by the final layer ($L_{j-1}$) of the merging section may be the merging section output. The merging section may comprise one or more convolutional layers.

The merging section output may be received by a first layer of the output section of the ConvNet. The output section may comprise multiple layers. The output section may comprise one or more convolutional layers. Each layer of the output section, other than the final layer $L_n$ receives a merged latent representation MLT as input, and determines a merged latent representation MLT as output, to be provided as input to the next layer. In one of the layers of the output section, additional data may be input to the ConvNet, referred to as context data. This data may be provided in a format other than the multidimensional objects of the input IN. The context data CTXD may for example be a scalar or a vector and may represent a characteristic or property of the product unit but which is not in the form of an image.

Context data may relate to a product unit and/or processes affecting the product unit. For example context data CXTD may comprise a product unit type, product unit ID. Context data CXTD may also comprise data relating to an apparatus affecting the product unit, for example a lithographic apparatus LA, e.g. apparatus ID, apparatus parameters. Context data CXTD may also comprise metrology data relating to a process for patterning the product unit performed by an apparatus, for example temperature, pressure, time/date input data was obtained. Context data may be represented in binary form, for example a bit representing whether a particular product feature (e.g. a chuck) is used or not. Context data may comprise one or more integer values, e.g. representing an exposure time or other processing variable. Context data may contain data not present in the input data. As described herein, context data CXTD may be added at the output section of the ConvNet. Context data may be concatenated in a vector and added to the ConvNet. A vector may be added by combining it with an output of one layer in the ConvNet and processed through the remaining layers of the ConvNet. For example, the context variables may be added as part of a feedforward part of the ConvNet in the output section.

The context data may hold some information not present in the distributional data and can help prediction. For example, each apparatus and chuck may have a unique fingerprint which effects the multidimensional data. Knowing that a wafer is exposed on a specific apparatus or chuck, for example, may help the model to better capture the parameter of interest, e.g. the overlay. The context data may correlate to a pre-defined structure present on a patterned substrate, for example as a result of using a particular chuck or apparatus for patterning a substrate. The context data may cause a segmentation of the feature space for the multidimensional objects processed by a ConvNet, wherein the segmentation takes into account the content of the context data. For example, product units patterned using a first chuck may be have different properties to a product unit patterned using a second chuck. A ConvNet may be trained to predict an object structure on a product unit, correlating to the pre-defined structure, based on provided context data.

A multidimensional object may comprise a collection of one or more channels. The channels may relate to the same data set, but may represent different sub-categories, or subsets, of data. For example, a multidimensional object may be a colour image, and may comprise three channels for red, green, and blue colour information. In another example a multidimensional object may represent data in an n-dimensional space, and may comprise n channels, one for each of the n dimensions. For example, alignment data may be represented in a two-dimensional space (n=2) for alignment in the X and Y directions, wherein a multidimensional object comprises two channels, showing the spatial distribution of alignment in the X and Y directions, respectively. A multidimensional object may comprise a collection of matrices, wherein a matrix represents a channel. The channel may be a two-dimensional matrix. An element in the channel matrix may be a scalar value. A ConvNet may be configured to be able to receive input in a predetermined format. For example, A ConvNet may be able to receive the multidimensional object in the form of one or more channels. A latent representation produced by a layer in the ConvNet may have a similar format to the input. Each layer in a ConvNet may be configured to receive one or more input channels, and provide one or more output channels forming the latent representation output by that layer. A latent representation may comprise one or more channels. A channel of a latent representation may be a two-dimensional matrix. The amount of input channels to a layer may differ from the amount of output channels to a layer.

Figure 6:
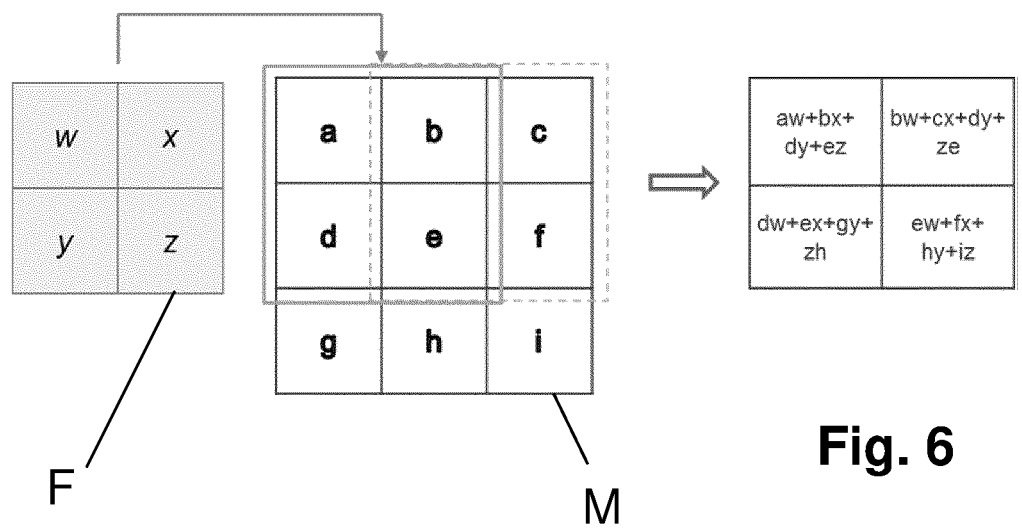
FIG. 6 depicts an example convolutional filter applied to a matrix.

A convolutional layer may perform a convolution operation on the input to that layer. FIG. 6 illustrates an example convolution operation using filter F on matrix M. In this example, matrix M may represent an input channel. As illustrated in FIG. 6, a sum of a product of elements of filter F and a portion of matrix M may be provided as an element of the output channel of the convolution operation. Filter F may slide over the matrix to determine multiple elements of the output channel. Factors that may contribute to the size of the output channel include the size of filter F, the size of matrix M, the step size (stride) with which the filter slides over matrix M. These factors may be set as part of the configuration of the ConvNet. For example, in FIG. 6, the step size in both dimensions of the filter F over matrix M is one element, leading to a 2 by 2 output matrix.

By choosing the filter size(s) for each matrix in the input section, the output of each division going into the merging section can be made to be the same size. The size of the output of a layer may also be determined by one or more other hyperparameters of the convolution operation, for example the stride of filter F, or padding added to a matrix (e.g. rows and/or columns of zeros added to a matrix). For each multidimensional object input to a ConvNet, the filter F size and other hyperparameters may be set so that the output of the input section for each division is a latent representation of size K, wherein K is the same for each division. Multiple filters may be applied to a multidimensional object and/or its latent representations over a plurality of layers in the ConvNet. The size K of the input section output may be determined by the size and/or other hyperparameters of the plurality of layers.

In this way, the input layers can take input data in the form of multidimensional objects of different sizes and use the correct choice of filters and hyperparameters to convert the data into latent representations of the same size which can be merged. Thus, when the input wafer maps have different sizes/layouts, then the filter sizes (and other hyperparameters of the convolutional operation such as padding and stride) change such that the output sizes of the input section for all input data is the same size.

In a convolutional layer, at least one filter is applied to the each input channel. One filter may be applied to the input to determine one output channel. If there are multiple input channels, the same filter may be applied to each of the one or more input channels, or different filters may be applied to different input channels. The output channel may comprise a sum of the results of the convolution of the filter with the different input channels. The sum may be a weighed sum. In order to obtain multiple output channels, different filters may process the same one or more input channels. For example, taking a layer with one input channel, a first filter may be applied to the input channel to obtain a first output channel. A second filter may be applied to the input channel to obtain a second output channel, independent of the first output channel.

The ConvNet may comprise a non-linear layer for adding non-linearity to an output of a layer. A non-linear layer may be placed as the layer following immediately after a convolutional layer. Using a non-linear layer may improve the learning performance of a ConvNet. A non-linear layer may for example be a rectifier linear unit, for removing negative values from an output channel. Further example non-linear layers include a sigmoid function layer, and a hyperbolic tangent function layer.

The ConvNet may comprise a pooling layer. A pooling layer may be inserted after a convolutional layer of a ConvNet. For example, a ConvNet may comprise a convolutional layer, followed by a rectifier layer, followed by a pooling layer. The convolutional, rectifier, and pooling layers may be immediately consecutive layers. A pooling layer may be used to reduce the size of the channel. The size of a channel may be defined by the number of elements in the channel. A pooling layer may achieve a reduction in channel size for example by dividing an input channel into separate segments, wherein each segment comprises a plurality of elements of the input channel. The pooling layer may then determine an output for each separate segment, wherein the amount of elements output for each segment is smaller than the amount of elements in the segment. As a result, the output channel is smaller than the input channel. The determination of an output for each segment may be performed by applying a function to a segment. Example functions may include calculating an average value, selecting the highest value in a segment (max pooling), selecting the lowest value in a segment, etc. An advantage of using a pooling layer is that it may reduce the amount of data processed inside the ConvNet.

The input section may comprise at least one convolutional layer. A input section may for example comprise one or more convolutional layers. One or both of the merging section and the output section may also comprise a convolutional layer. Any of the convolutional layers in the ConvNet may be followed by one or both of a non-linear layer and a pooling layer. An advantage of including a plurality of convolutional layers in a ConvNet is that it may provide a hierarchical manner in which the subsequent layers learn features of the input. The first convolutional layers may recognise more prominent features of the channel, for example edges, or gradients within the channel. Later convolutional layers may analyse more abstract features of the channel.

The ConvNet may comprise layers other than a convolutional layer, a non-linear layer, or a pooling layer. A ConvNet may comprise one or more feedforward layers. A ConvNet may comprise one or more fully connected layers, or partially connected layers of weights and biases. For example, in a case where the output of a ConvNet comprises a classification label, the output section of the ConvNet may comprise one or more feedforward layers. The feedforward layers may take the output of the previous layer and multiply it with a weight matrix. The output of a feedforward layer may be a single matrix. Context data (e.g. identification data of a lithography apparatus LA and/or a metrology tool MT) may be added to a feedforward layer.

The preceding paragraphs of the description provide various options for the ConvNet in terms of the different layers which may or may not be included therein. It will be appreciated that the choice of which layers to employ will be application specific and a working model will require some optimisation to provide the required result from the output. Hence, a particular ConvNet may or may not include one or more non-linear layers or pooling layers, and these may be present in different sections of the ConvNet.

Applying a ConvNet to a plurality of multidimensional objects may determine a model output. The model output may comprise the predicted property. In some instances, one or more processing steps may be performed on the model output. The one or more processing steps may be used to determine the predicted property from the model output. A predicted property associated with a product unit may be a property of a pattern formed on the product unit, using a lithographic apparatus LA. For example, the predicted property may, amongst others, relate overlay or alignment of features on the substrate for a particular processing method or apparatus. A predicted property be provided to a lithographic apparatus LA in order to determine on or more set-point of the lithographic apparatus LA. Processing steps for determining one or more set-point of a lithographic apparatus LA based at least in part on a predicted property may be performed by one or both of a lithographic apparatus LA, on a computer system CL. The product unit may be a semiconductor substrate. Obtaining a plurality of data sets may comprise obtaining metrology data from a processed semiconductor substrate.

In order to provide a desired output from which a property can be predicted, a ConvNet is trained using known data. Training a ConvNet may comprise obtaining training data associated with the product unit, for example a plurality of processed substrates in for which the property, i.e. the desired output of the ConvNet such as overlay, has been established using other methods. Thus, the ConvNet may be trained based on the obtained training data, to predict a property of the product unit, such as a parameter (e.g. alignment, overlay, and/or levelling) relating to the product unit, and/or a classification of the product unit. The parameter may be a data feature comprised within the multidimensional objects to be provided to the ConvNet. The data feature may correlate with a pre-defined data feature comprised within the training data, for example a pattern applied to the product unit. The data feature may relate to the parameter of interest, for example overlay, alignment, and/or levelling data for a pattern applied to the product unit.

In one example, a ConvNet was trained using a training data set of 1800 product units using the set-up and processing method of interest. 80% of the training data was used for training the ConvNet, and 20% was used for testing the trained ConvNet. Once a ConvNet is trained and tested, it may be used to determine outputs for data other than training data, for example, on product units unseen by the model such as those which may be produced during a fabrication run or as part of a calibration exercise.

In some examples it may be necessary to periodically retrain the model. This is particularly so if the processing method and/or apparatuses used to produce the product unit change or are changed over time. Retraining may be required with new training data obtained from the modified processing method or apparatus.

The training data may comprise input data to be provided to the ConvNet, for example in the form of a plurality of data sets represented as multidimensional objects. The training data may comprise one or more properties of an apparatus used to pattern a product unit for which a property is to be measured. The pre-defined structure in the training data may comprise metrology data relating to the input data. The metrology data may represent a parameter to be estimated by the ConvNet.

Figure 7:
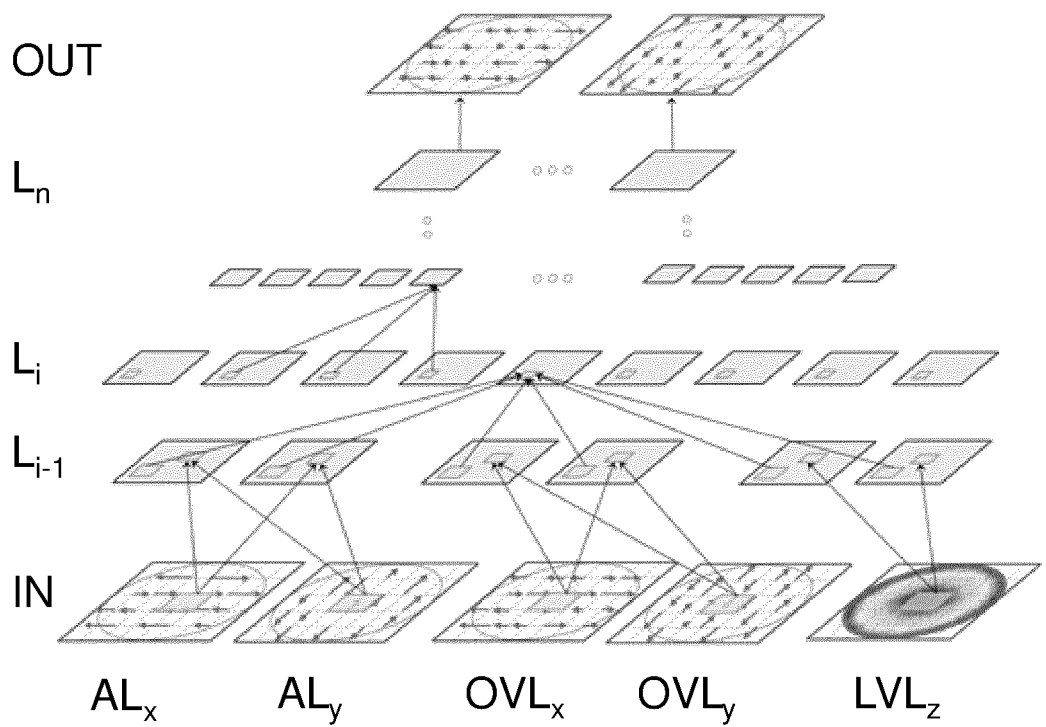
FIG. 7 depicts a schematic representation of the structure of a convolutional network model using input metrology data.

FIG. 7 illustrates the application of a ConvNet to data relating to lithographic patterning of a substrate, in order to predict a property of a substrate. The property may be a spatial distribution of overlay across the substrate. The predicted overlay distribution may be used for example to adjust recipe parameters for a subsequent patterning exposure in order to improve the patterning quality. Overlay may be difficult to measure, because measurements is time-consuming and requires marks on the substrate for making the measurements. Therefore, an advantage of the ConvNet illustrated in FIG. 7 may be to obtain an overlay property using less or no overlay metrology.

As shown in FIG. 7 alignment data AL, levelling data LVL, and overlay fingerprint data OVL for a product unit may be provided as input IN data sets to a ConvNet. Alignment data and levelling data may be metrology data obtained from the product unit. Overlay fingerprint data may include the averaged overlay data of the apparatus that patterned the product unit. Alignment data and overlay data may be provided for two directions, the X-direction and the Y-direction. Alignment data for each direction may be represented as a two-dimensional matrix, representing a channel. These two dimensions may correspond to two separate measurements of alignment, in the respective X and Y directions. The directions may be perpendicular, or any other two non-parallel directions. The data sets are represented as multidimensional objects. Specifically, the alignment and overlay multidimensional objects each comprise two two-dimensional matrices (2 channels forming one multidimensional object), a first channel for the X-direction ($AL_x$, $OVL_x$), and a second channel for the Y-direction ($Al_y$, $OVL_y$). The levelling multidimensional object comprises a spatial distribution of a height profile across the product unit and is represented by a single two-dimensional matrix ($LVL_z$). The three multidimensional objects may have different sizes and/or spatial layouts. In the input section layers $L_1$ to $L_{i-1}$, alignment, overlay, and levelling channels are processed separately. Each layer may provide two latent representation channels as output. Over layers $L_1$ to $L_{i-1}$, the three divisions map the different data sets onto the same object layout. The input section output may for example comprise 6 two-dimensional matrices of the same size. In layer $L_i$, the 6 two-dimensional matrices are merged to create a latent representation based on a combination of alignment AL, overlay OVL, and levelling LVL data. Further layers $L_{i+1}$ to $L_n$ are applied to process the merged product unit patterning data. The output OUT of layer $L_n$ comprises data that may be used to predict a spatial distribution of overlay OVL on the product unit.

Although FIG. 7 represents a combination of overlay fingerprint OVL, alignment AL, and levelling LVL data provided as input IN to the ConvNet, other combinations of input data sets, including subsets of overlay OVL, alignment AL, and levelling LVL, and/or other parameters may also be used according to this disclosure. Example applications of a ConvNet for prediction of a property associated with a product unit include using sparse alignment data and dense levelling data to predict dense alignment data; using alignment data, levelling data, and overlay data to predict yield of dies on a substrate; and using overlay data and alignment data to assign groups to substrates based on overlay and/or yield of the substrate.

The method described herein may be used to determine and/or update one or more control parameters and/or recipes for controlling a lithographic apparatus LA. The one or more parameters and/or recipes may be associated with a property predicted according to a method described herein. The recipe may comprise a plurality of set-points of a control parameter associated with the property associated with a product unit predicted according to the methods described above. The control parameter may be associated with control of an overlay error of an exposure by the lithographic apparatus LA. The plurality of set-points may be provided as a metrology map. The plurality of set-points may be provided as coefficients of a high order model describing positioning errors across a substrate. The recipe may be used to calibrate the lithographic apparatus LA. The calibration based on the recipe may be performed periodically. Calibration of the lithographic apparatus LA may comprise calibration of one or both of a coordinate system of a substrate positioning system and a substrate measuring system within the lithographic apparatus.

The methods described herein may be provided in the form of instructions comprised in a computer program. The computer program may be executed on at least one processor in order to carry out the steps of the method. The method may be performed by a computer system CL or a lithographic apparatus LA. The computer system CL or lithographic apparatus LA comprises a processor, or may comprise a plurality of processors. The processor may be configured to predict a property in accordance with the methods described herein. The processor may be connected to a carrier, which may be comprised within computer system CL or another apparatus connected to the computer system CL, for example a metrology tool MT. The carrier may be one of an electronic signal, optical signal, radio signal, or non-transitory computer readable storage medium, for example a memory. The carrier comprises instructions which, when executed on a processor, cause the processor to control an apparatus to carry out any of the methods as described above.

Further aspects of the inventions are disclosed in the list of numbered clauses below:

1. A method for predicting a property associated with a product unit, the method comprising:
    obtaining a plurality of data sets, wherein each of the plurality of data sets comprises data associated with a spatial distribution of a parameter across the product unit;
    representing each of the plurality of data sets as a multidimensional object;
    obtaining a convolutional neural network model trained with previously obtained multidimensional objects and properties of previous product units;
    applying the convolutional neural network model to the plurality of multidimensional objects representing the plurality of data sets, to predict the property associated with the product unit.

2. The method according to clause 1, wherein the convolutional neural network model comprises a plurality of sections, the plurality of sections comprising an input section, a merging section and an output section.

3. The method of clause 2 wherein each section comprises at least one convolution operation.

4. The method according to any of clauses 2 or 3 wherein the input section comprises a plurality of divisions, each division configured to receive one of the plurality of the multidimensional objects, the method further comprising inputting each of the multidimensional objects separately to a respective one division, wherein each division determines an input section output for the respective multidimensional object.

5. The method according to clause 4, further comprising inputting the plurality of input section outputs to the merging section to determine a merging section output.

6. The method according to clause 5, wherein a first and a second of the plurality of multidimensional objects have different layouts with respect to each other, and the input section transforms the different layouts such that the input section outputs which correspond to the first of the plurality of multidimensional objects and second of the plurality of multidimensional objects have a common layout.

7. The model according to clause 6, wherein the method comprises:
    applying, in the input section, one or more first filters to the first of the plurality of multidimensional objects and
    applying, in the input section, one or more second filters to the second of the plurality of multidimensional objects;
    wherein the application of the one or more first filters and the application of the one or more second filters is set to determine the common layout of the input section outputs corresponding to the first and second of the plurality of multidimensional objects.

8. The method according to clause 6 or clause 7, wherein the different layouts comprise different sizes.

9. The method according to clause 8, wherein the input section outputs comprise a plurality of latent representations having the same size.

10. The method according to any of clauses 5 to 9 further comprising inputting the merging section output to the output section to determine a model output of the convolutional neural network model.

11. The method according to any of clauses 2 to 10, wherein each section comprises a plurality of layers.

12. The method according to clause 11, wherein at least one of the plurality of layers is a pooling layer.

13. The method according to any of the preceding clauses, further comprising:
    obtaining training data associated with the product unit; and
    training, based on the obtained training data, the convolutional neural network model to predict a data feature within the multidimensional objects and relating to the parameter;
    wherein the data feature correlates with a pre-defined data feature comprised within the training data.

14. The method according to clause 13 wherein the training data comprises one or more properties of an apparatus used to pattern the product unit.

15. The method according to any of the preceding clauses, wherein the data in a data set is metrology data associated with a spatial distribution of data points across the product unit.

16. The method according to any of the preceding clauses wherein the plurality of data sets comprise one or more of:
   alignment data of the product unit;
   levelling data of the product unit; and
   overlay fingerprint data of an apparatus used to pattern the product unit.

17. The method according to any of the preceding clauses wherein the property to be predicted is a spatial distribution of a target parameter across the product unit.

18. The method according to clause 17, wherein the target parameter is overlay.

19. The method according to any the preceding clauses wherein one of the plurality of data sets has a different resolution to at least one other of the plurality of data sets.

20. The method according to any of the preceding clauses wherein the data associated with a spatial distribution comprises a plurality of data points corresponding to a plurality of positions on the product unit, wherein the plurality of positions of a first of the plurality of data sets is different from the plurality of positions of a second of the plurality of data sets.

21. The method according to any of the preceding clauses further comprising:
   obtaining context data corresponding to the plurality of data sets; and
   providing the context data to the convolutional neural network model.

22. The method according to clause 21, further comprising
   training the convolutional neural network to predict an object structure comprised within features of the plurality of multidimensional objects, wherein the object structure correlates with a pre-defined structure comprised within the context data.

23. The method according to any of the preceding clauses wherein applying the convolutional neural network model to the plurality of multidimensional objects determines a model output, wherein the model output comprises the property or a classification.

24. The method according to any of clauses 1 to 23, wherein the method further comprises predicting the property by performing one or more processing steps on the model output.

25. The method according to either of clauses 23 and 24, wherein the classification is a classification label identifying one or more of: a group of product units according to a property of the product units; a binary indicator representing where the data is within a predetermined classification.

26. The method according to any of the preceding clauses further comprising providing the property to a lithographic apparatus to determine one or more set points of the apparatus.

27. The method according to any of the preceding clauses wherein the property associated with a product unit is a property of a pattern formed using a lithographic apparatus on the product unit.

28. The method according to any of the preceding clauses, wherein the product unit is a semiconductor substrate and obtaining a plurality of data sets comprises obtaining metrology data from a processed semiconductor substrate.

29. A lithographic apparatus comprising:
   a processor configured to predict a property in accordance with the method of any of clauses 1 to 28.

30. The lithographic apparatus according to clause 29, wherein the lithographic apparatus is further configured to determine one or more set points of the lithographic apparatus based on the property.

31. A recipe for controlling a lithographic apparatus comprising one or more set points of a control parameter associated with a property predicted according to the method of any of clauses 1 to 28.

32. The recipe according to clause 31, wherein the control parameter is associated with control of an overlay error of the lithographic apparatus.

33. A computer program comprising instructions which, when executed on at least one processor, cause the at least one processor to carry out the steps of the method according to any of clauses 1 to 28.

34. A carrier containing the computer program of clause 33, wherein the carrier is one of an electronic signal, optical signal, radio signal, or non-transitory computer-readable storage medium.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A method comprising:
   obtaining a plurality of data sets, wherein each of the plurality of data sets comprises data associated with a spatial distribution of a parameter across a substrate and wherein one of the plurality of data sets has a different resolution and/or different spatial positions of data points compared to at least one other of the plurality of data sets;
   representing each of the plurality of data sets as a multidimensional object;
   obtaining a convolutional neural network model trained with previously obtained multidimensional objects and properties of previous substrates; and applying the convolutional neural network model to the plurality of multidimensional objects representing the plurality of data sets, to predict a property associated with the substrate.

2. The method according to claim 1, wherein the convolutional neural network model comprises a plurality of sections, the plurality of sections comprising an input section, a merging section and an output section.

3. The method according to claim 2, wherein the input section comprises a plurality of divisions, each division configured to receive one of the plurality of the multidimensional objects, and further comprising inputting each of the multidimensional objects separately to a respective one division, wherein each division determines an input section output for the respective multidimensional object.

4. The method according to claim 3, further comprising inputting the plurality of input section outputs to the merging section to determine a merging section output.

5. The method according to claim 4, wherein a first and a second of the plurality of multidimensional objects have different layouts with respect to each other, and the input section transforms the different layouts such that the input section outputs which correspond to the first of the plurality of multidimensional objects and second of the plurality of multidimensional objects have a common layout.

6. The method according to claim 5, further comprising:
applying, in the input section, one or more first filters to the first of the plurality of multidimensional objects; and
applying, in the input section, one or more second filters to the second of the plurality of multidimensional objects,
wherein the application of the one or more first filters and the application of the one or more second filters is set to determine the common layout of the input section outputs corresponding to the first and second of the plurality of multidimensional objects.

7. The method according to claim 1, further comprising:
obtaining training data associated with the substrate; and
training, based on the obtained training data, the convolutional neural network model to predict a data feature within the multidimensional objects and relating to the parameter,
wherein the data feature correlates with a pre-defined data feature comprised within the training data.

8. The method according to claim 1, wherein the plurality of data sets comprise one or more selected from
alignment data of the substrate;
levelling data of the substrate; and/or
overlay fingerprint data of an apparatus used to pattern the substrate.

9. The method according to claim 1, wherein the property to be predicted is a spatial distribution of a target parameter across the substrate.

10. The method according to claim 9, wherein the target parameter is overlay.

11. The method according to claim 1, wherein the one of the plurality of data sets has a different resolution compared to the at least one other of the plurality of data sets.

12. The method according to claim 1, further comprising:
obtaining context data corresponding to the plurality of data sets; and
providing the context data to the convolutional neural network model.

13. The method according to claim 12, further comprising training the convolutional neural network to predict an object structure comprised within features of the plurality of multidimensional objects, wherein the object structure correlates with a pre-defined structure comprised within the context data.

14. The method according to claim 1, wherein applying the convolutional neural network model to the plurality of multidimensional objects determines a model output, wherein the model output comprises the property or a classification.

15. The method according to claim 14, wherein the model output comprises the classification and the classification is a classification label identifying one or more selected from: a group of substrates according to a property of the substrates; and/or a binary indicator representing where the data is within a predetermined classification.

16. A computer program product comprising a computer-readable medium having instructions therein, the instructions, upon execution by a computer system, configured to cause the computer system to at least:
obtain a plurality of data sets, wherein each of the plurality of data sets comprises data associated with a spatial distribution of a parameter across a substrate and wherein one of the plurality of data sets has a different resolution and/or different spatial positions of data points compared to at least one other of the plurality of data sets;
represent each of the plurality of data sets as a multidimensional object;
obtain a convolutional neural network model trained with previously obtained multidimensional objects and properties of previous substrates; and
apply the convolutional neural network model to the plurality of multidimensional objects representing the plurality of data sets, to predict a property associated with the substrate.

17. The computer program product according to claim 16, wherein the convolutional neural network model comprises a plurality of sections, the plurality of sections comprising an input section, a merging section and an output section.

18. The computer program product according to claim 17, wherein the input section comprises a plurality of divisions, each division configured to receive one of the plurality of the multidimensional objects, and the instructions are further configured to cause the computer system to input each of the multidimensional objects separately to a respective one division, wherein each division determines an input section output for the respective multidimensional object.

19. The computer program product according to claim 16, wherein the instructions are further configured to cause the computer system to:
obtain context data corresponding to the plurality of data sets; and
provide the context data to the convolutional neural network model.

20. The computer program product according to claim 19, wherein the instructions are further configured to cause the computer system to train the convolutional neural network to predict an object structure comprised within features of the plurality of multidimensional objects, wherein the object structure correlates with a pre-defined structure comprised within the context data.

* * * * *